(12) United States Patent
Suresh et al.

(10) Patent No.: US 10,962,481 B2
(45) Date of Patent: Mar. 30, 2021

(54) AMINE DETECTION USING SURFACE ENHANCED RAMAN SPECTROSCOPY WITH FUNCTIONALIZED NANOPARTICLES

(71) Applicants: Radhika Suresh, Sugar Land, TX (US); Sankaran Murugesan, Katy, TX (US); Valery N. Khabashesku, Houston, TX (US); Darryl Ventura, Houston, TX (US)

(72) Inventors: Radhika Suresh, Sugar Land, TX (US); Sankaran Murugesan, Katy, TX (US); Valery N. Khabashesku, Houston, TX (US); Darryl Ventura, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 52 days.

(21) Appl. No.: 15/698,007

(22) Filed: Sep. 7, 2017

(65) Prior Publication Data

US 2018/0067054 A1    Mar. 8, 2018

Related U.S. Application Data

(60) Provisional application No. 62/384,779, filed on Sep. 8, 2016.

(51) Int. Cl.
*G01N 21/65* (2006.01)
*G01N 21/25* (2006.01)

(52) U.S. Cl.
CPC . *G01N 21/658* (2013.01); *G01N 2201/12746* (2013.01)

(58) Field of Classification Search
CPC .............. G01N 21/658; G01N 17/00; G01N 2021/0346; G01N 21/0332; G01N 21/05;
(Continued)

(56) References Cited

U.S. PATENT DOCUMENTS 8,070,956 B2   12/2011   Peterman et al.
8,414,755 B2    4/2013   Peterman
(Continued)

FOREIGN PATENT DOCUMENTS

| EP | 1660320 B1 | 5/2013 |
|---|---|---|
| WO | 2009102598 A1 | 8/2009 |
| WO | 2010057212 A1 | 5/2010 |

OTHER PUBLICATIONS

Benhabib et al. "Surface-Enhanced Raman Spectroscopy for Rapid and Cost-Effective Quantification of Amines in Sour Water", SPE-177406-MS (2015) 6 pages.
(Continued)

*Primary Examiner* — Jennifer Wecker
(74) *Attorney, Agent, or Firm* — Cantor Colburn LLP (57) ABSTRACT

A method of analyzing a selected refinery chemical at a low concentration comprises contacting a sample with functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; radiating the sample contacted with the functionalized metallic nanoparticles with electromagnetic radiation at a selected energy level; measuring a Raman spectrum emitted from the sample; and determining the presence or a concentration of a selected refinery chemical in the sample from the Raman spectrum.

20 Claims, 5 Drawing Sheets

(58) Field of Classification Search
 CPC ............... G01N 21/274; G01N 21/65; G01N 2201/06113; G01N 2201/1087; G01N 33/0057; G01N 33/2882; G01N 2201/12746
 See application file for complete search history.

(56) References Cited

U.S. PATENT DOCUMENTS

| | | | |
|---|---|---|---|
| 8,574,916 B2* | 11/2013 | Natan | G01N 21/658 436/98 |
| 8,702,976 B2 | 4/2014 | Peterman | |
| 8,792,095 B2 | 7/2014 | Piorek et al. | |
| 8,917,389 B2 | 12/2014 | Piorek et al. | |
| 8,999,263 B2 | 4/2015 | Peterman et al. | |
| 9,036,144 B2 | 5/2015 | Lee | |
| 2004/0180379 A1 | 9/2004 | Duyne et al. | |
| 2009/0225310 A1* | 9/2009 | Yang | G01N 21/658 356/301 |
| 2009/0279073 A1 | 11/2009 | Sardashti et al. | |
| 2009/0311798 A1 | 12/2009 | Wimberger-Friedl et al. | |
| 2010/0276310 A1* | 11/2010 | Chen | C04B 35/62807 206/223 |
| 2011/0007310 A1 | 1/2011 | Sardashti et al. | |
| 2012/0225493 A1 | 9/2012 | Piorek et al. | |
| 2012/0236304 A1 | 9/2012 | Lee et al. | |
| 2012/0280209 A1* | 11/2012 | Bonnell | H01L 51/42 257/21 |
| 2013/0244337 A1 | 9/2013 | Meinhart et al. | |
| 2013/0271758 A1* | 10/2013 | Marchant | G01N 21/65 356/301 |
| 2013/0293884 A1* | 11/2013 | Lee | G01N 21/01 356/301 |
| 2014/0125976 A1 | 5/2014 | Kim et al. | |
| 2014/0166863 A1* | 6/2014 | Yamada | G01N 21/65 250/216 |
| 2014/0186939 A1 | 7/2014 | Peterman et al. | |
| 2014/0275685 A1* | 9/2014 | Sanchez Valente | C07C 5/48 585/658 |
| 2014/0373649 A1* | 12/2014 | Harrell | G01N 17/00 73/866 |
| 2015/0362433 A1* | 12/2015 | Zhou | G01N 33/5432 506/9 |
| 2016/0177698 A1 | 1/2016 | Schultheiss et al. | |
| 2016/0033415 A1* | 2/2016 | Meinhart | G01N 21/05 435/34 |
| 2017/0074799 A1 | 3/2017 | Peterman et al. | |
| 2017/0315061 A1 | 11/2017 | Ventura et al. | |
| 2018/0298277 A1 | 10/2018 | Borrell et al. | |
| 2020/0124534 A1 | 4/2020 | Murugesan et al. | |

OTHER PUBLICATIONS

Duggan, et al. "Multiple Corrosion Mechanisms in Crude Distillation Overhead System", 2009; 7 pages.
International Search Report, International Application No. PCT/US2017/050600, dated Dec. 19, 2017, Korean Intellectual Property Office; International Search Report 3 pages.
International Written Opinion, International Application No. PCT/US2017/050600, dated Dec. 19, 2017, Korean Intellectual Property Office; International Written Opinion 7 pages.
Lack, Joel E. "An In-Depth Look at Amine Behavior in Crude Units Using Electrolyte-Based Simulation", Paper No. 05570, Sugarland, TX, Corrosion 2005; 16 pages.
Lee, et al., "Selective and Rapid Room Temperature Detection of H2S Using Gold Nanoparticle Chain Arrays", Dept.of Chemical and Envirionmental Engineering, University of California, Dept. of Chemical Engineering, University of Delaware, 2011; 6 pages.
Preston et al. "Recent Advances in Crude Unit Corrosion Control", Australian Corrosion Association Inc Victorian Branch, Technical Presentation, Jun. 2001; 17 pages.
U.S. Appl. No. 16/164,011 filed Oct. 18, 2018, 24 pages.
European Search Report for European Application No. 17849578.4 dated Mar. 30, 2020, 11 pages.
Myoung Nosoung et al: "Surface-enhanced Raman scattering detection of toluene and dichlorobenzene vapors using 1-propanethiol-linked Ag nanoparticles", Journal of Nanophotonics, Society of Photo-Optical Instrumentation Engineers, 1000 20th St. Bellingham WA 98225-6705 USA, vol. 8, No. 1, (Jan. 1, 2014), pp. 83083-083083-7.

* cited by examiner

AMINE DETECTION USING SURFACE ENHANCED RAMAN SPECTROSCOPY WITH FUNCTIONALIZED NANOPARTICLES

CROSS-REFERENCE TO RELATED APPLICATIONS

The present application claims priority to U.S. Provisional Patent Application No. 62/384,779, filed Sep. 8, 2016. The contents of the priority application are hereby incorporated by reference in their entirety.

BACKGROUND

The present disclosure is directed to a method and apparatus for detecting the presence or a concentration of chemicals, and, in particular, to a method of using Surface Enhanced Raman Spectroscopy (SERS) to determine concentrations of chemicals in refinery effluent streams.

Nitrogen-bearing compounds other than ammonia are often found in refinery effluent streams as they are used in the closed-loop process for removing hydrogen sulfide from the process streams. Nitrogen-bearing compounds, however, can form salts in crude unit towers and overhead towers of the refineries. Amine-HCl salt corrosion is the most common form of corrosion impacting refinery processing units, and monoethanolamine (MEA) is the most common and problematic of the contaminant amines. In order to monitor the chemicals such as MEA and ultimately locate the chemicals' carryover source, it is necessary to measure the chemicals from parts per million down to parts per billion levels, but this could not be accomplished by titrimetry or ion-selective electrode methods. Other methods such as chromatography techniques are tedious and can be time consuming to generate results. An efficient and precise monitoring method is therefore needed in order to allow an operator to take prompt and appropriate action to mitigate corrosion risk in refinery parts.

BRIEF DESCRIPTION

A method of analyzing a selected refinery chemical comprises contacting a sample with functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; radiating the sample contacted with the functionalized metallic nanoparticles with electromagnetic radiation at a selected energy level; measuring a Raman spectrum emitted from the sample; and determining the presence or a concentration of a selected refinery chemical in the sample from the Raman spectrum.

A system for analyzing a selected refinery chemical comprises a substrate comprising functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; and a Raman spectrometer configured to determining the presence or a concentration of a selected refinery chemical in a sample that is in contact with the substrate from a Raman spectrum of the sample.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have discovered methods and systems that can be used to determine the amount of certain chemicals such as amines in refinery effluent streams. The methods and systems are cost effective and easy to use. They allow the detection and quantification of chemicals down to 1 part per million (ppm). In addition, the results can be quickly generated without performing multiple tedious steps.

Surface Enhanced Raman Spectroscopy (SERS) is a surface-sensitive detection technique that is used to detect molecules adsorbed on rough metal surfaces or nanostructures. The methods disclosed herein use functionalized metallic nanoparticles as a SERS substrate. The unique substrate provides enhancements in Raman signals of the adsorbed molecules in an order of up to $10^6$. The enhancement allows the detection and/or measurement of chemicals such as amines at parts per million (ppm) or even parts per billion (ppb) levels. Moreover, the functionalized metallic nanoparticles have a unique and strong peak which can be used as an internal standard for calibration purpose so that the results are consistent from batch to batch.

The functionalized metallic nanoparticles comprise metallic nanoparticles functionalized with a functional group comprising a cyano group, a thiol group, a carboxyl group, an amino group, a boronic acid group, an aza group, an ether group, a hydroxyl group, or a combination comprising at least one of the foregoing. Cyano groups are preferred. In an embodiment, the functionalized metallic nanoparticles are free of sulfur or any sulfur-containing moieties. In another embodiment the functionalized metallic nanoparticles are not associated with sulfur or any sulfur-containing moieties or compounds. The functionalized metallic nanoparticles include gold, silver, copper, nickel, aluminum, or a combination comprising at least one of the foregoing. Gold nanoparticles are preferred. In a specific exemplary embodiment, the functionalized metallic nanoparticles are gold nanoparticles functionalized with a cyano group.

As used herein, "functionalized metallic nanoparticles" include both non-covalently functionalized metallic nanoparticles and covalently functionalized metallic nanoparticles. Non-covalent functionalization is based on van der Walls forces, hydrogen bonding, ionic interactions, dipole-dipole interactions, hydrophobic or π-π interactions. Covalent functionalization means that the functional groups are covalently bonded to the metallic nanoparticles, either directly or via an organic moiety.

Any known methods to functionalize the fillers can be used. For example, surfactants having the functional groups described herein can be used to non-covalently functionalize the metallic nanoparticles. The functional group can be adsorbed on a surface of the metallic nanoparticles.

Another way to functionalize the metallic nanoparticles is to treat a precursor of metallic nanoparticles with a reducing agent. Exemplary precursors include chloroauric acid, gold (III) chloride; gold (III) iodide, trichloro(pyridine)gold(III), chloro(triphenylphosphine)gold(I), gold(I) cyanide, gold (III) bromide, gold(I) sulfide, gold(III) hydroxide, chloro (triethylphosphine)gold(I), methyl(triphenylphosphine)gold (I), or a salt thereof. Example salts include a sodium salt or a potassium salt such as potassium gold (III+) chloride. Exemplary reducing agent includes an amino acid such as glycine and aspartic acid. The reaction can be conducted at a temperature of about 15° C. to about 50° C. Higher or lower temperatures can be used to expedite or slow down the reaction. The reaction is conducted at a pH of greater than 7, for example greater than about 7 to less than or equal to about 14, or greater than about 8 and less than about 12. As a specific example, functionalized gold nanoparticles are prepared by treating a gold nanoparticle precursor such as chloroauric acid or a salt thereof such as $KAuCl_4$ with glycine at a pH of greater than about 7.

In an embodiment, the functional group is covalently bonded to the metallic nanoparticles. The functional group can be directly bonded to the metallic nanoparticles without any intervening atoms. Alternatively, the functional group is bonded to the metallic nanoparticles via one or more intervening atoms or moieties. The functional groups can be present in an amount of about 0.1 wt. % to about 60 wt. %, about 1 wt. % to about 20 wt. %, or about 5 wt. % to about 15 wt. %, each based on the total weights of the functionalized metallic nanoparticles.

The functionalized metallic nanoparticles have an average particle size, in at least one dimension, of less than one micrometer. As used herein "average particle size" refers to the average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. In an embodiment, the functionalized metallic nanoparticle have an average particle size of about 1 to about 500 nanometers (nm), specifically 2 to 250 nm, more specifically about 5 to about 150 nm, more specifically about 10 to about 125 nm, and still more specifically about 15 to about 75 nm or about 20 to about 50 nm.

Without wishing to be bound by theory, it is believed that functionalized metallic nanoparticles enhance Raman signature of certain chemicals, allowing these chemicals to be quantified at ppm or even sub ppm levels with sufficient accuracy. Further, the functionalized metallic nanoparticles have a unique Raman peak, which can be used as an internal reference. The unique Raman peak can be a peak at about 2,000 $cm^{-1}$ to about 2,300 $cm^{-1}$, about 2,100 $cm^{-1}$ to about 2,200 $cm^{-1}$, or about 2152 $cm^{-1}$ on a Raman spectrum. Without wishing to be bound by theory, it is believed that the unique Raman peak is generated by the functional group bonded to the metallic nanoparticles. Advantageously, the Raman peak does not overlap with the bands generated by the chemicals to be analyzed.

Thus in an embodiment no internal references are added to the functionalized metallic nanoparticles or used together with the sample to be analyzed. As used herein, internal references include any reference compounds with known structures and/or known amounts, which are used to calibrate the Raman intensity of the bands of an analyte.

Exemplary internal references include but are not limited to 4-nitro thiophenol, 4-mercapto benzoic acid, 4-bromothiophenol, 2-mercaptopyridine (MPy), benzenethiol (BT), 3,4-dicholorobenzenethiol (DBT), 3-fluorothiophenol (3-FTP), 4-fluorothiophenol (4-FTP), 3,5-bis(trifluoromethyl)benzenethiol (3-FMBT), methylene blue (MB), Nile blue A (NBA), and rhodamine 6G (R6G). Decanethiol, Octadecane thiolate, 4-mercaptobenzoic acid (MBA), and 1,4-benzenedithiol, 4-aminobenzenethiol (4-ATP), 2-naphthalenethiol (2-NT), 4-bromobenzenethiol (4-BBT), 4-chlorobenzenethiol (4-CBT), 4-fluorobenzenethiol (4-FBT), 3,4-dichlorobenzenethiol (3,4-DCT), benzenethiol (BT), 3,5-dichlorobenzenethiol (3,5-DCT), and 2-mercapto-6-methylpyridine (2-MMP). Although not needed, an internal reference can also be optionally used.

Functionalized metallic nanoparticles can be used in different ways. In an embodiment, a substrate for SERS is a sol or colloidal suspension of functionalized metallic nanoparticles in a fluid such as water. The concentration of the functionalized metallic nanoparticles is about 0.01 wt. % to about 70 wt. %, about 1 wt. % to about 25 wt. %, or about 5 wt. % to about 20 wt. %, based on the total weight of the sol or colloidal suspension. A colloidal suspension of functionalized metallic nanoparticles in water can have a pH of greater than 7, for example greater than about 7 to less than or equal to about 14, or greater than about 8 and less than about 12.

In another embodiment, a substrate for SERS comprises a first layer of functionalized metallic nanoparticles and a second layer of a support layer. The support layer comprises glass, silica, ceramics, a polymer such as polydimethylsiloxane, graphene, carbon nanotubes, silicon wafers, a semiconducting material or a combination comprising at least one of the foregoing. As used herein, a semiconducting material refers to a substance whose electrical conductivity is intermediate between that of a metal and an insulator. Exemplary semiconducting materials include, but are not limited to metal oxides, such as zinc oxide, copper oxides, titanium oxides, bismuth oxides, and the like. The functionalized metallic nanoparticles can be deposited or coated on the support layer. Optionally, the functionalized nanoparticles are further aligned on the support layer by applying an AC electric field to the functionalized metallic nanoparticles. The alignment includes but is not limited to forming functionalized metallic nanoparticle chains on a surface of the support layer. Without wishing to be bound by theory, it is believed that the Raman signals for certain chemicals such as amines and amino alcohols can be further enhanced by aligning the functionalized metallic nanoparticles.

The functionalized metallic nanoparticles can also be incorporated into a matrix such as glass, silica, or a polymer such as polydimethylsiloxane, or ceramics, graphene, carbon nanotubes, silicon wafers, a semiconducting material or a combination comprising at least one of the foregoing. There are at least two ways to incorporate functionalized metallic nanoparticles into a matrix. One way is to combine preformed functionalized metallic nanoparticles with a matrix material, and then forming the composite substrate by drop-casting, spin-coating, molding, extrusion, or the like. The other is to generate the composite substrate in situ by incorporating the matrix material in the reaction to produce functionalized metallic nanoparticles. After the solvent used in the reaction is removed, the mixture can be molded to form a composite substrate.

The substrate containing functionalized metallic nanoparticles can be used with a Raman spectrometer for performing SERS on a sample in order to detect the presence or concentration of a selected refinery chemical in the sample. In an embodiment, the sample is drawn from a fluid such as refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams, and combinations thereof. As a specific example, the fluid is a hydrocarbon extracted from a reservoir in an earth formation or a further processed fluid thereof. A further processed fluid refers to a fluid that has been treated to remove undesired materials or solid, if any. As another specific example, the sample is an aqueous based fluid such as sour water or treated sour water. The sample can be directly analyzed. However, if desired, the sample can be pre-purified before being analyzed to remove undesired impurities in solid or liquid forms. Such pre-purification includes filtration, column treatment, and other methods known to a person skilled in the art.

Refinery chemicals that can be analyzed using the substrate containing functionalized metallic nanoparticles include a nitrogen-containing compound, a sulfur-containing compound, benzene, toluene, ethylbenzene, xylene, trichloroethylene, tetrachloroethane, antibiotics, boron-containing compounds or ions, chlorides, perchlorides, sulphides, sulfates, phosphates, carbonates, iron ions, lead ions, arsenic ions, or a combination comprising at least one of the foregoing. Exemplary nitrogen-containing compounds include amines; amino alcohols; amino thiols, atrazine, acetochlor, metalochlor, alachlor, melamine, or hydrazine. In an embodiment, the refinery chemical is monoethanolamine (MEA), dimethylethanolamine (DMEA), methylamine (MA), or methyl diethanolamine (MDEA). Multiple chemicals can be detected in one run.

The methods as disclosed herein can have a quick turn-around time. The total test time is less than about 10 minutes, less than about 8 minutes, or less than about 6 minutes.

The methods are effective to determine selected refinery chemicals at a low concentration, for example equal to or greater than about 1 parts per billion (ppb) to about 1,000 parts per million (ppm) or at a concentration of equal to or greater than about 1 ppm to about 1,000 ppm.

Any Raman spectrometer known in the art can be used together with the substrate containing the functionalized metallic nanoparticles. In use, a sample is contacted with the substrate, and electromagnetic energy is directed at the sample from an energy source of the Raman spectrometer. The energy source can be a laser; and the electromagnetic energy can be a monochromatic beam provided at a frequency or energy level that is attuned to at least one of a vibrational or rotational excitation of the chemical of interest in the sample. The electromagnetic energy excites the electrons of the chemical of interest to a virtual energy state. As the excited electrons fall back into a lower energy state, it emits photons that can be either lower energy (Stokes scattering) or higher energy (anti-Stokes scattering) than the energy of the incident electromagnetic energy. The emitted photons are received at a detector of the spectrometer. The detector generates signals indicative of the energy of the received photon. The signals are then sent to a control unit for processing.

The control unit includes a processor, a memory storage device, generally a solid-state memory storage device, and one or more programs stored in the memory storage device and accessible to the processor. When the one or more programs are executed or run by the processor, the processor produces a spectrum of the emitted photons. The spectrum can be observed or reviewed in order to identify chemicals and relative chemical concentrations within the sample. The processor can determine the presence or absence of a selected refinery chemical in the sample or determine the concentration of a chemical in the sample. The processor can also provide control signals to various components to control a level of the chemicals. The control unit can be part of the Raman spectrometer or can be independent of the Raman spectrometer.

EXAMPLES

Functionalized gold nanoparticles were synthesized using glycine as a reducing agent. A 100 ml aqueous solution containing 0.004 g $KAuCl_4$ and 0.004 g glycine was prepared in which the pH was adjusted with 5M NaOH (0.05 mL which equals to 2 drops from a 1 mL syringe) before addition of glycine. The solution was incubated at room temperature in a dark environment for three days. The color of the solution changed from colorless to red after the reaction indicating the formation of functionalized gold nanoparticles. The functionalized gold nanoparticles have an average size of about 40 nm as determined by scanning electron microscopy (SEM).

Figure 1:
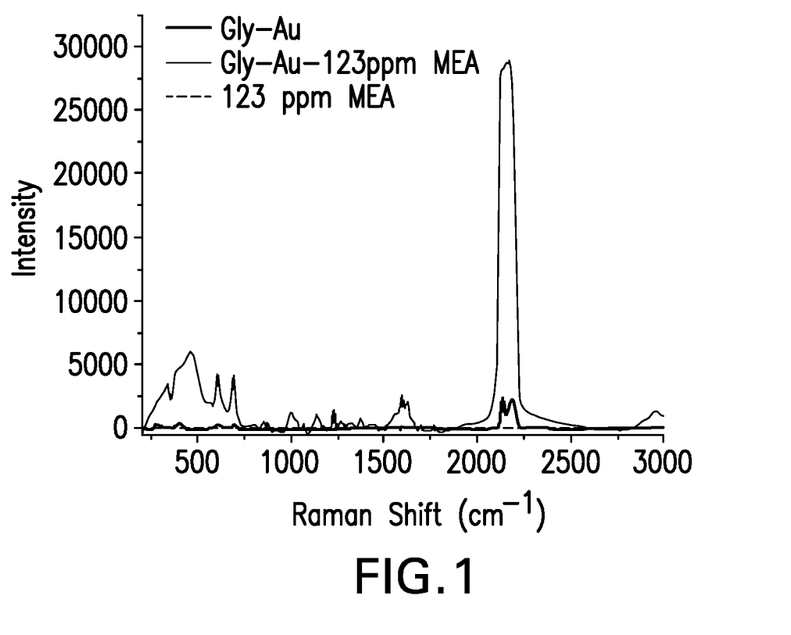
FIG. 1 compares the Raman spectrum of an amine sample alone (MEA), the Raman spectrum of functionalized metallic nanoparticles alone (Gly-Au), and the Raman spectrum of an amine sample contacted with functionalized metallic nanoparticles (Gly-Au-MEA)
Figure 2:
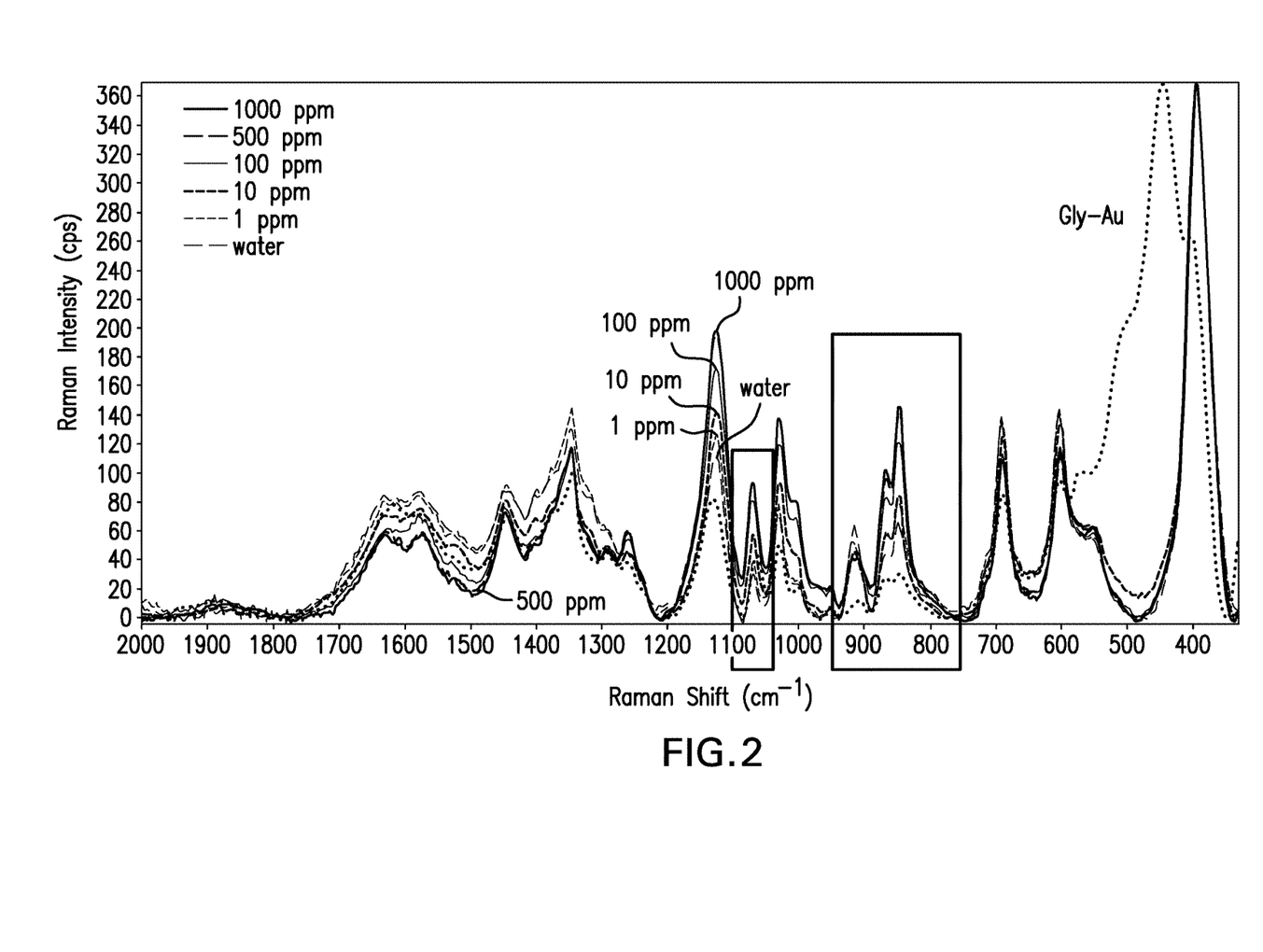
FIG. 2 shows various Raman spectroscopy spectra for a selected refinery chemical obtained by performing SERS on the chemical.
Figure 3:
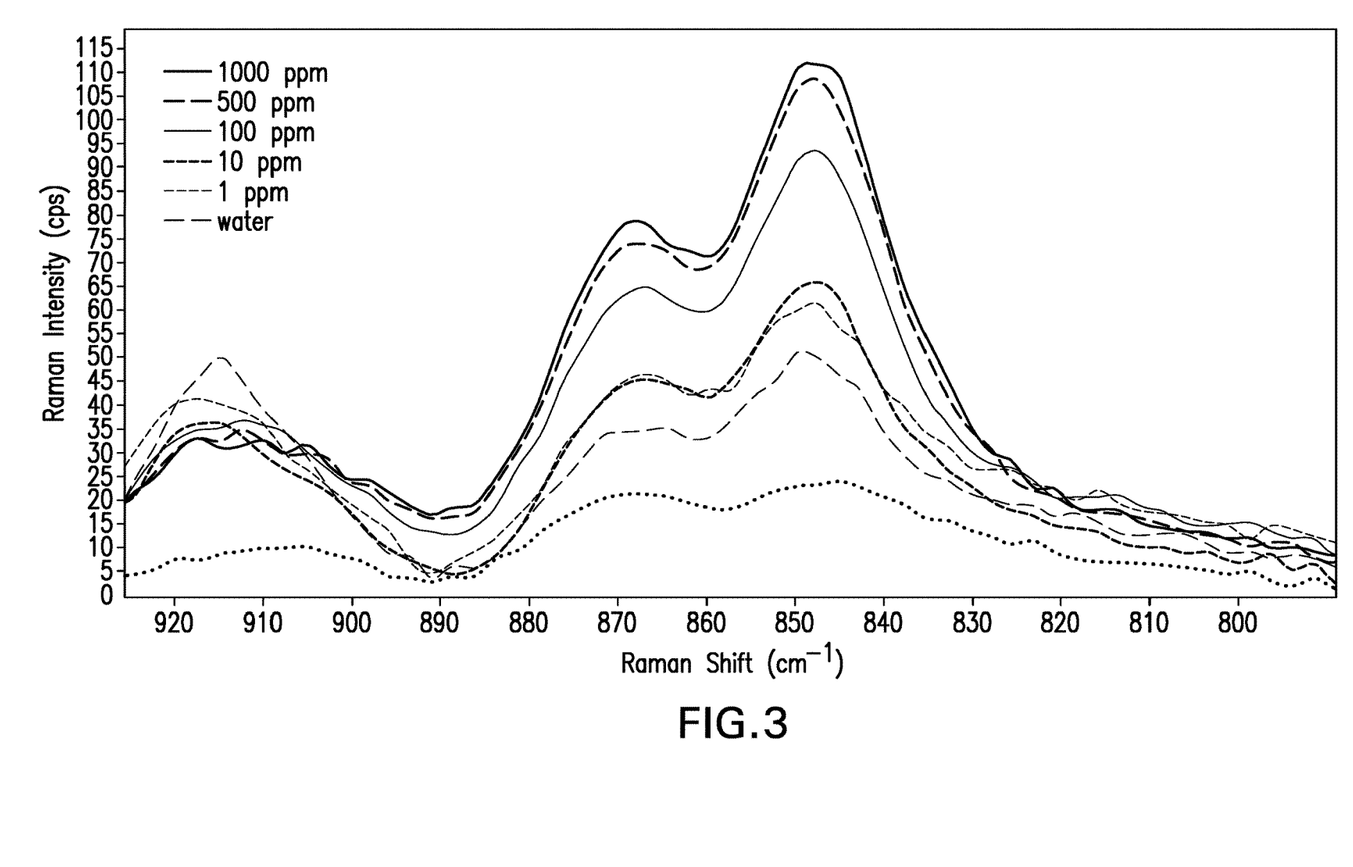
FIG. 3 shows various Raman spectroscopy spectra for a selected refinery chemical obtained by performing SERS on the chemical.

The prepared functionalized gold nanoparticles in an aqueous medium were contacted with a sample containing 123 ppm of monoethanolamine (MEA). The obtained Raman spectrum is shown in FIG. 1. FIG. 1 also includes the Raman spectrum of functionalized gold nanoparticles alone and the Raman spectrum of MEA sample alone. FIG. 2 and FIG. 3 show various Raman spectroscopy spectra for a selected refinery chemical having various concentrations obtained by performing SERS on the chemical.

As shown in FIG. 1, a sample containing 123 ppm of MEA does not have any noticeable Raman signal. After the MEA sample is contacted with the functionalized gold nanoparticles, Raman spectrum shows peaks in the 860-840 $cm^{-1}$ region, which are indicative of the presence of MEA. Additional peaks are listed in Table 1 below. FIGS. 1-3 demonstrate that the monoethanolamine can be detected at a low concentration using functionalized gold nanoparticles.

TABLE 1

| | |
|---|---|
| 417 | CC deformation |
| 481 | CC deformation |
| 815 | $CH_2$ rocking + CN stretching |
| 845 | $CH_2$ rocking + CN stretching |
| 873 | $CH_2$ rocking + CN stretching |
| 1030 | CN stretching |
| 1070 | CC stretching |
| 1100 | CO stretching |
| 1240 | $CH_2$ twisting |
| 1303 | $CH_2$ twisting |
| 1352 | $CH_2$ wagging |
| 1460 | CH bend |
| 1600 | NH bending |

FIG. 1 also shows that functionalized nanoparticles have a sharp Raman peak around 2136 $cm^{-1}$. The signature peak can be used as an internal standard for quantitative Raman analysis. Raman analysis of pure glycine doesn't show any peak around this region. Presence of this band may be due to the C≡N bond present in the functionalized gold nanoparticles. To confirm the presence of C≡N bond on the gold nanoparticles, Prussian blue, which has strong was selected as a model molecule.

Figure 5:
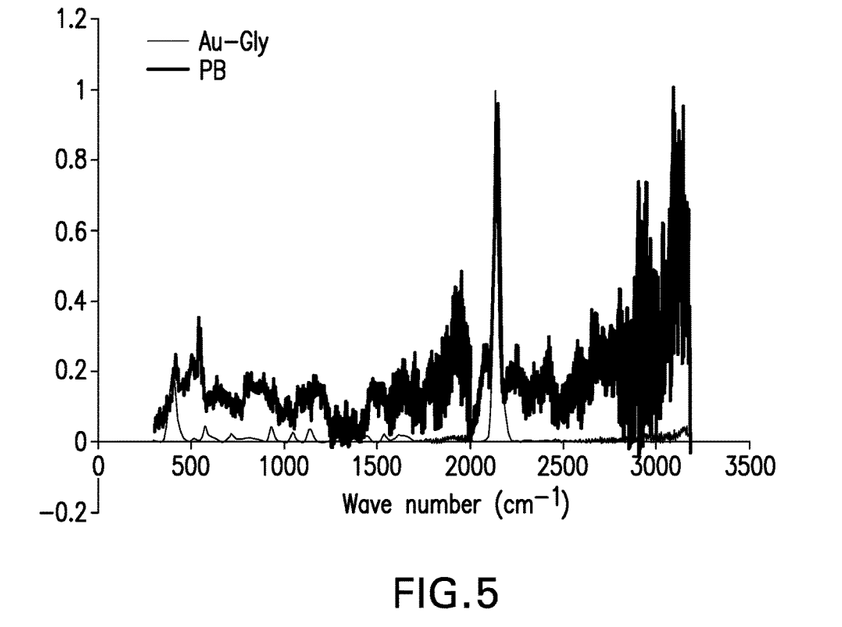
FIG. 5 compares the Raman spectra of cyano functionalized gold nanoparticles (Au-Gly) with the Raman spectra of potassium ferrocyanide (Prussian blue, PB).

Prussian blue compound was synthesized through a reaction of $K_4Fe(CN)_6$ with $FeCl_3$ in water. As shown in FIG. 5, Prussian blue has strong Raman peak around 2152 $cm^{-1}$ due to C≡N symmetric stretching frequency. This stretching frequency matches exactly with the functionalized gold nanoparticles confirming the presence of C≡N group which is formed during the synthesis of functionalized nanoparticles.

Figure 4:
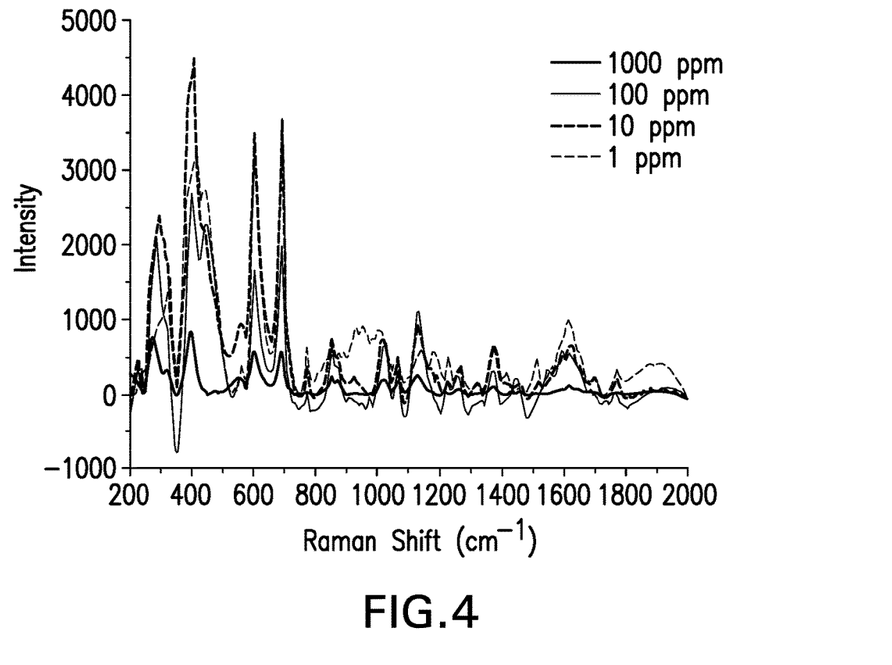
FIG. 4 shows Raman spectra of amine samples having various concentrations, where the amine samples are contacted with functionalized metallic nanoparticles.

Different concentrations of MEA were tested using functionalized gold nanoparticles in an aqueous medium as a substrate. The spectra are shown in FIG. 4. The spectra can be used to obtain a calibration curve. From the analysis it can be seen that with the functionalized gold nanoparticles it is possible to detect even 1 ppm of MEA.

Set forth below are various embodiments of the disclosure.

Embodiment 1

A method of analyzing a selected refinery chemical at a low concentration, the method comprising:
contacting a sample with functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing;
radiating the sample contacted with the functionalized metallic nanoparticles with electromagnetic radiation at a selected energy level;
measuring a Raman spectrum emitted from the sample; and
determining the presence or a concentration of a selected refinery chemical in the sample from the Raman spectrum.

Embodiment 2

The method as in any prior embodiment, wherein the metallic nanoparticles comprises Au, Ag, Cu, Ni, Al, or a combination comprising at least one of the foregoing.

Embodiment 3

The method as in any prior embodiment, wherein the selected refinery chemical is a nitrogen-containing compound, a sulfur-containing compound, benzene, toluene, ethylbenzene, xylene, trichloroethylene, tetrachloroethane, antibiotics, boron-containing compound or ions, chlorides, perchlorides, sulphides, sulfates, phosphates, carbonates, iron ions, lead ions, arsenic ions, or a combination comprising at least one of the foregoing.

Embodiment 4

The method as in any prior embodiment, further comprising using a Raman peak of the functionalized metallic nanoparticles as an internal standard to calibrate the measured concentration of the selected refinery chemical in the sample.

Embodiment 5

The method as in any prior embodiment, wherein no internal standards are used together with the functionalized metallic nanoparticles.

Embodiment 6

The method as in any prior embodiment, wherein the functional group comprises a cyano group.

Embodiment 7

The method as in any prior embodiment, wherein the functional group is covalently bonded to the metallic nanoparticles. Alternatively or in addition, the functional group is adsorbed onto a surface of the metallic nanoparticles.

Embodiment 8

The method as in any prior embodiment, wherein the functionalized metallic nanoparticles are derived from a precursor of the metallic nanoparticles and an amino acid at a pH of greater than about 7.

Embodiment 9

The method as in any prior embodiment, wherein the functionalized metallic nanoparticles comprise gold nanoparticles functionalized with a cyano group, and the functionalized metallic nanoparticles are free of sulfur or any sulfur-containing moieties.

Embodiment 10

The method as in any prior embodiment, wherein the functionalized metallic nanoparticles are present in a sol or colloidal suspension.

Embodiment 11

The method as in any prior embodiment, wherein the functionalized metallic nanoparticles are disposed on a support layer. The support layer comprises glass, silica, graphene, carbon nanotubes, ceramics, a polymer, a semiconducting material, or a combination comprising at least one of the foregoing.

Embodiment 12

The method as in any prior embodiment, wherein the functionalized metallic nanoparticles are disposed in a matrix comprising glass, silica, ceramics, a polymer, a semiconducting material, or a combination comprising at least one of the foregoing.

Embodiment 13

The method as in any prior embodiment, wherein the method is effective to determine a nitrogen-containing compound at a concentration of equal to or greater than about 1 parts per billion to about 1,000 parts per million with a standard deviation of about 0.1% to about 5%.

Embodiment 14

The method as in any prior embodiment, wherein the functionalized metallic particles have an average particle size of about 5 nanometers to about 350 micrometers.

Embodiment 15

A system for analyzing a selected refinery chemical at a low concentration, the system comprising:
a substrate comprising functionalized metallic nanoparticles that contain metallic nanoparticles functionalized with a functional group comprising a cyano group, a thiol group, a carboxyl group, an amino group, a boronic acid group, an aza group, an ether group, a hydroxyl group, or a combination comprising at least one of the foregoing; and
a Raman spectrometer configured to determining the presence or a concentration of a selected refinery chemical in a sample that is in contact with the substrate from a Raman spectrum of the sample.

Embodiment 16

The system as in any prior embodiment, wherein the substrate comprises functionalized metallic nanoparticles in a sol or colloidal suspension.

Embodiment 17

The system as in any prior embodiment, wherein the substrate comprises functionalized metallic nanoparticles disposed on a support layer, the support layer comprising glass, silica, graphene, carbon nanotubes, ceramics, a polymer, a semiconducting material, or a combination comprising at least one of the foregoing.

Embodiment 18

The system as in any prior embodiment, wherein the substrate comprises functionalized metallic nanoparticles disposed in a matrix comprising glass, silica, ceramics, or a polymer.

Embodiment 19

The system as in any prior embodiment, wherein the functionalized metallic nanoparticles are derived from a precursor of the metallic nanoparticles and an amino acid at a pH of greater than about 7.

Embodiment 20

The system as in any prior embodiment, wherein the functionalized metallic nanoparticles comprise gold nanoparticles functionalized with a cyano group, and the functionalized metallic nanoparticles are free of sulfur or any sulfur-containing moieties.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of analyzing a selected refinery chemical at a low concentration, the method comprising: contacting a sample with functionalized metallic nano particles that contain metallic nanoparticies functionalized with a cyano group covalently bonded to the metallic nanoparticles without intervening atoms, the metallic nanoparticles comprising Au, Ag, Cu, Ni, Al, or a combination comprising at least one of the foregoing; radiating the sample contacted with the functionalized metallic nanoparticles with electromagnetic radiation at a selected energy level; measuring a Raman spectrum emitted from the sample; and determining the presence or a concentration of a selected refinery chemical in the sample from the Raman spectrum, wherein the selected refinery chemical is a nitrogen-containing compound, a sulfur-containing compound, benzene, toluene, ethylbenzene, xylene, trichloroethylene, tetrachloroethane, antibiotics, boron-containing compound or ions, chlorides, perchlorides, sulphides, sulfates, phosphates, carbonates, iron ions, lead ions, arsenic ions, or a combination comprising at least one of the foregoing.

2. The method of claim 1 wherein the metallic nanoparticles comprises Au, Ag, or a combination comprising at least one of the foregoing.

3. The method of claim 1, wherein the selected refinery chemical is a nitrogen-containing compound.

4. The method of claim 1, further comprising using a Raman peak of the functionalized metallic nanoparticles as an internal standard to calibrate the measured concentration of the selected refinery chemical in the sample.

5. The method of claim 1, wherein no internal standards are used together with functionalized metallic nanoparticles.

6. The method of claim 1, wherein the functionalized metallic nanoparticles are derived from a precursor of the metallic nanoparticles and an amino acid at a pH of greater than about 7.

7. The method of claim 1, wherein the functionalized metallic nanoparticles are free of sulfur or any sulfur-containing moieties.

8. The method of claim 1, wherein the functionalized metallic nanoparticles are present in a sol or colloidal suspension.

9. The method of claim 1, wherein the functionalized metallic nanoparticles are disposed on a support layer.

10. The method of claim 9, wherein the support layer comprises glass, silica, graphene, carbon nanotubes, ceramics, a polymer, a semiconducting material, or a combination comprising at least one of the foregoing.

11. The method of claim 1, wherein the functionalized metallic nanoparticles are disposed in a matrix comprising glass, silica, ceramics, a polymer, or a semiconducting material.

12. The method of claim 1, wherein the method is effective to determine a nitrogen-containing compound at a concentration of equal to or greater than about 1 parts per billion to about 1,000 parts per million with a standard deviation of about 0.1% to about 5%.

13. The method of claim 1, wherein the functionalized metallic particles have an average particle size of about 5 nanometers to about 350 micrometers.

14. A system for analyzing a selected refinery chemical at a low concentration, the system comprising:
- a substrate comprising functionalized metallic nanoparticles that contain metallic nanoparticles functionalized with a functional group, which is covalently bonded to the metallic nanoparticle without intervening atoms, the functional group comprising a cyano group; and
- a Raman spectrometer configured to determining the presence or a concentration of a selected refinery chemical in a sample that is in contact with the substrate from a Raman spectrum of the sample
wherein the functionalized metallic nanoparticles comprise gold or silver nanoparticles functionalized with a cyano group, and the functionalized metallic nanoparticles are free of sulfur or any sulfur-containing moieties.

15. The system of claim 14, wherein the substrate comprises functionalized metallic nanoparticles in a sol or colloidal suspension.

16. The system of claim 14, wherein the substrate comprises functionalized metallic nanoparticles disposed on a support layer, the support layer comprising glass, silica, graphene, carbon nanotubes, ceramics, a polymer, a semiconducting material, or a combination comprising at least one of the foregoing.

17. The system of claim 14, wherein the substrate comprises functionalized metallic nanoparticles disposed in a matrix comprising glass, silica, ceramics, a polymer, or a semiconducting material.

18. The system of claim 14, wherein the functionalized metallic nanoparticles are derived from a precursor of the metallic nanoparticles and an amino acid at a pH of greater than about 7.

19. The system of claim 14, wherein the functionalized metallic nanoparticles comprise gold nanoparticles functionalized with a cyano group, and the functionalized metallic nanoparticles are free of sulfur or any sulfur-containing moieties.

20. The method of claim 1, wherein the functionalized metallic nanoparticles comprise gold or silver nanoparticles functionalized with a cyano group; the functionalized metallic nanoparticles are free of sulfur or any sulfur-containing moieties; and the selected refinery chemical is a nitrogen-containing compound.

* * * * *